Oct. 8, 1968    J. W. DRAYTON    3,404,424
SCRAPER STRUCTURE FOR A ROLL
Filed Dec. 23, 1965    2 Sheets-Sheet 2

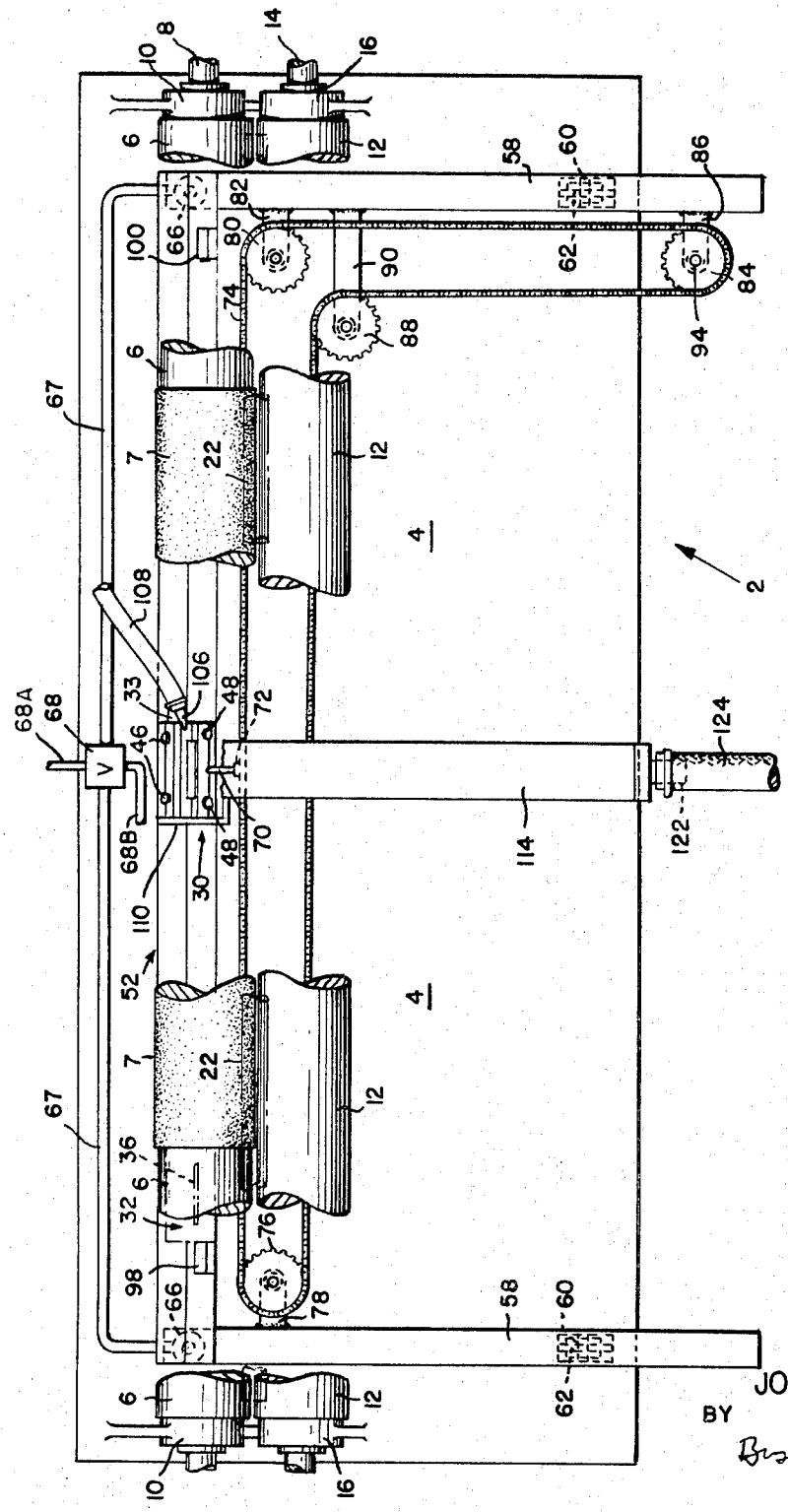

INVENTOR
JOHN W. DRAYTON
BY
ATTORNEYS

United States Patent Office 3,404,424
Patented Oct. 8, 1968

3,404,424
SCRAPER STRUCTURE FOR A ROLL
John W. Drayton, 220 Darby Road, Paoli, Pa. 19301
Filed Dec. 23, 1965, Ser. No. 515,841
5 Claims. (Cl. 15—308)

ABSTRACT OF THE DISCLOSURE

A scraper structure for a roll has a reciprocating carriage supporting a relatively short scraper blade with motor means to urge the blade toward the roll and to retract the blade. A continuous air jet is directed at the material removed from the roll to break it up. Vacuum means pick up the broken up material to convey it away from the roll. The air jet is directed towards the vacuum means. The vacuum means is closely fitted to the roll and pulls air across portions of the roll which have passed the blade as well as portions of the roll advancing to the blade. Baffle means cage the broken up material.

---

This invention relates to a scraper structure for a roll and more particularly relates to such a structure for removing unwanted material from the roll.

While it will be evident that the scraper structure of this invention has wide applicability for removing unwanted material which builds up on a rotating roll, the invention will be described in connection with apparatus for fabricating tubular stock by way of illustration. It is well known to form tubes from sheets of paper or nonwoven or woven sheets of cotton, rayon, polyester fibers, polyamide fibers and the like impregnated with a thermosetting resin, for example, a phenolic resin such as phenol formaldehyde or phenol furfural, an epoxy resin, a polyester resin or a melamine resin. The resin impregnated sheet is rolled onto a mandrel by a heated roller which provides heat for softening the partially cured resin. This latter roller necessarily picks up resin from the sheet and this resin is hardened on the roller due to the presence of heat. The resin build up on the heated roller must be removed to prevent the build up of the diameter of the roller and more importantly must be removed for the proper transfer of heat to the resin in the sheet since the resin on the roller acts as a thermal barrier.

Numerous problems are involved in the removal of the unwanted build up of resin on the heated roller. Indeed, the failure to solve this problem satisfactorily has resulted in the use of manual chipping to remove the resin frequently during each eight hour shift. This is a tedious and messy operation which results in a substantial loss of machine time. Further, for a substantial period between each cleaning of the roll, the heat transfer from the roller to the sheet is unsatisfactory.

In addition, the machines for forming such tubes provide very little space for the incorporation of apparatus to clean the heated roller. Further, the middle deflection of the hot roller as well as unevenness in build up of the resin on this roller makes conventional approaches such as the employment of full length doctor blades impractical. Further, it has been found that a blade of substantial length fails to properly penetrate the tightly adhering resin film.

The scraper structure of this invention overcomes all of the aforementioned problems.

The invention and its objects will be fully understood on reading the following description in conjunction with the drawings in which:

FIGURE 1 is a plan view of a scraper structure in accordance with the invention in association with the structure of an apparatus for making tubes;

Figure 4:
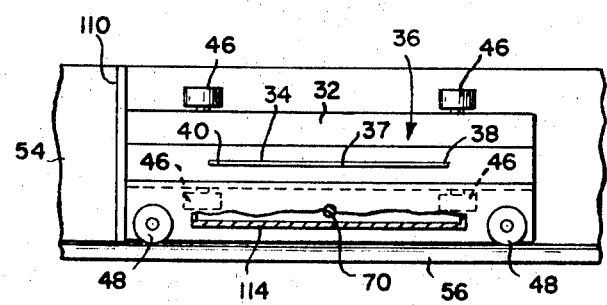
FIGURE 4 is a view taken on the plane indicated by the line 4—4 in FIGURE 3.

Referring first to FIGURE 1 a tube forming machine 2 (shown only in part) has a frame 4. A hollow roller 6 is mounted for rotation on a hollow shaft 8 through which steam is supplied to heat roller 6. Shaft 8 is mounted for rotation in bearings 10, 10 secured to frame 4. Similarly a hollow roller 12 is mounted for rotation with hollow shaft 14 through which cold water is supplied to cool roller 12. Shaft 14 is mounted for rotation in bearings 16, 16.

Figure 2:
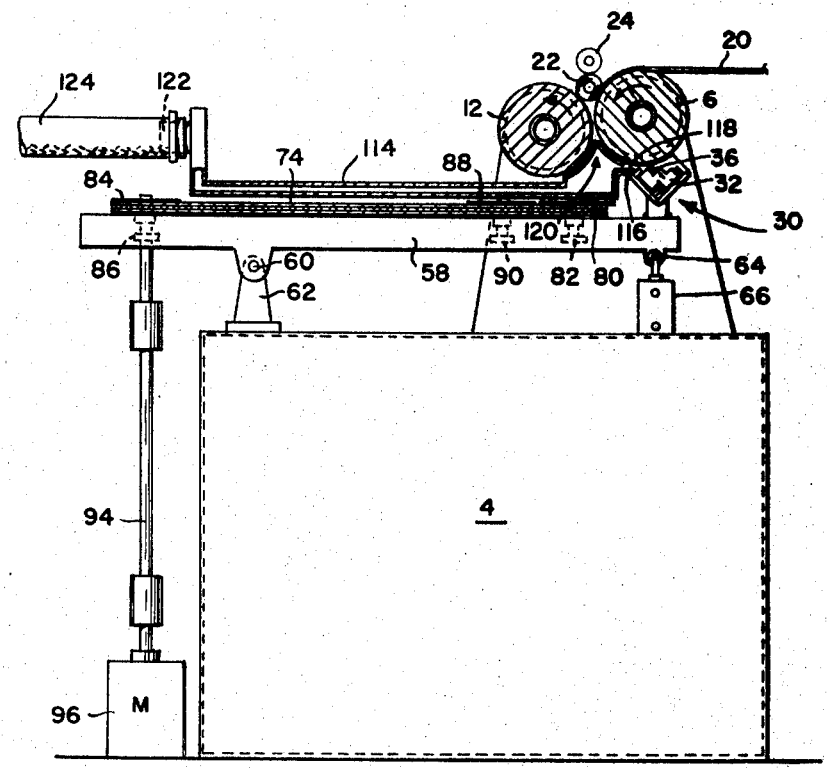
FIGURE 2 is a right end elevation of the structure of FIGURE 1 partially broken away.

As best seen in FIGURE 2 a resin impregnated sheet 20 is wound over the top of roller 6 onto a mandrel 22 which is urged downwardly by a pressure roller 24. Sheet 20 is rolled onto mandrel 22 by virtue of the rotation counterclockwise (as shown in FIGURE 2) of the driven rollers 6 and 12. Roller 6 subjects the resin 20 to heating prior to its being rolled onto mandrel 22 where it is further heated by roller 6. Resin 7 builds up on hot roller 6, but not on cool roller 12. The tube forming apparatus as thus described is conventional and well known to those skilled in the art. Hence, it is not deemed necessary to further detail its structure.

The scraper 30 of the invention has a carriage 32 provided with a slotted opening 34 which retains by the force of gravity a resilient blade 36 having a sharp razor edge 37 and may support blade 36 so that it is very slightly cocked with the end 38 slightly closer to roll 6 than end 40. This causes end 38 to bite sharply into the resin layer 7 built up on roller 6. Blade 36 is relatively short compared to the generally used scraper blade. For example, a blade having a length of from about 1″ to 3″ has been found to be very satisfactory. Steel blades are preferred.

Carriage 32 is provided with a plurality of rollers 46 each rotating on an axis substantially perpendicular to the plane of blade 36 and a plurality of rollers 48 each of which rotates on an axis lying in a plane substantially perpendicular to the plane of the axes of rollers 46. These rollers are supported by a V channel 52 having a leg 54 supporting rollers 46 and a leg 56 at right angles to leg 54 supporting rollers 48.

Each end of channel 52 is supported by an arm 58 pivotally mounted at 60 on a support 62 secured to frame 4 (FIGURE 2). Each arm 58 is pivotally connected at 64 to a hydraulic ram 66. Each ram 66 is connected to a line 67 (FIGURE 1) containing a valve 68 to which is connected a line 68a supplying oil under pressure and a line 68b leading to an oil reservoir (not shown).

An arm 70 is fixedly secured as by welding to carriage 32 and to an ear 72 secured to an endless roller chain 74. Chain 74 passes over sprocket 76 mounted on a bracket 78 secured to the adjacent arm 58, sprocket 80 mounted on bracket 82 secured to the adjacent arm 58, sprocket 84 mounted on bracket 86 secured to the adjacent arm 58 and sprocket 88 mounted on bracket 90 secured to the adjacent arm 58. Bracket 84 is driven by a shaft 94 connected to a reversible electric motor reductor unit 96 the direction of rotation of which is controlled by limit switches 98 and 100 which are actuated by carriage 32 at the extreme ends of its desired travel.

An air jet to break up the ribbon of material removed from roller 6 by blade 36 is supplied by a nozzle 106 secured to carriage 32 by a bracket 33 and connected to a flexible hose 108 which is of sufficient length to accommodate the travel of carriage 32 and which is connected to a source of air under pressure which is not shown. A baffle plate 110 (FIGURE 1) is secured to the end of carriage 32 opposite nozzle 106 to prevent any of the removed material from being blown out that end of the carriage 32.

Figure 3:
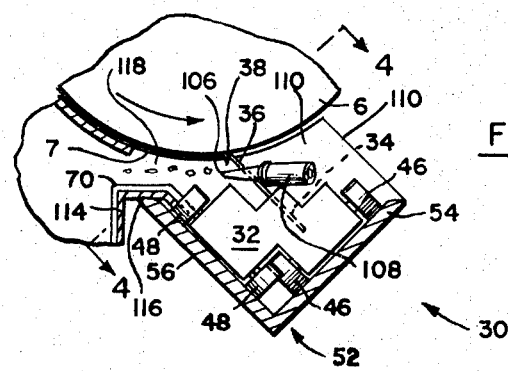
FIGURE 3 is an enlarged view, partly in section, showing the blade carrying carriage of the structure of FIGURE 1.

A vacuum conduit 114 is fixedly secured to carriage 32 at 116 as by welding and is provided with an inlet opening 118 (FIGURE 3) for pulling in the broken up material scraped off roller 6. Conduit 114 is shaped to fit closely under rollers 6 and 12 to insure that none of the removed material is drawn between rollers 6 and 12. Conduit 114 has an outlet fitting 122 which is connected to a flexible hose 124 of sufficient length to permit the free movement of conduit 114 with carriage 32 and which is connected to a source of vacuum which is not shown.

The scraper 30 is placed in operation generally after a number of tubes have been formed so that there is an appreciable build up of resin 7 on roller 6. At the commencement of operation, the carriage 32 is positioned so that blade 36 is opposite a clean portion of roller 6 lying beyond the build up of resin 7 (FIGURE 1). Valve 68 is operated to connect line 67 to pressure line 68a to cause rams 66 to elevate arms 58 and, hence, V-shaped beam 52 and carriage 32 so as to bring the cocked blade 36 into contact with roller 6. Electric motor 96 is then started to cause chain 74 to move carriage 32 along roller 6 causing blade 36 to engage the film 7 and remove it in the form of a narrow ribbon. Air from nozzle 106 impinges upon the ribbon and breaks it up, with the broken up pieces of ribbon being removed by being sucked through opening 118 into vacuum conduit 114 and thence into vacuum line 124. The travel of the carriage 32 reverses each time it engages one of the limit switches 98 or 100 which are connected to a conventional control circuit (not shown) for motor 96. Normally, one pass of the carriage is sufficient. Occasionally a back and forth pass is necessary to clean the roller 6.

The pivoted arms 58, which are urged upwardly at a selected desired pressure by rams 66, along with the short blade 36 readily accommodate for any middle deflection of roller 6. Further they provide for the lowering of the blade 36 from roller 6 when the cleaning is completed to prevent the blade from becoming fouled with gummy uncured resin.

Since blade 36 must be changed frequently, for example once in each 8 hour shift, the ready removal of blade 36 from slot 34 is a marked advantage.

It will be understood that the above description is by way of illustration and is not intended to be limiting.

What is claimed is:

1. In a scraper structure for a roll for the removal of hardened resin therefrom:
   a carriage,
   means supporting the carriage for movement along the length of the roll,
   means to secure a relatively short scraper blade to the carriage,
   means to reciprocate the carriage along the length of the roll,
   motor means to urge the blade toward the roll and to retract the blade; and
   means directing a continuous air jet at the resin material removed from the roll to break up said material and vacuum means to continuously pick up the broken up resin material and convey it away from the roll.

2. A scraper structure in accordance with claim 1 in which the air jet is directed generally towards the vacuum means.

3. The scraper structure of claim 1 in which the vacuum means includes a conduit having an inlet and means to support said conduit adjacent said air jet means with the inlet end of the conduit fitting closely to the roll.

4. The scraper structure of claim 1 having baffle means opposite the air jet means to channel broken up material towards the vacuum means.

5. A scraper structure in accordance with claim 1 in which the air jet is directed generally towards the vacuum means, and the vacuum means includes a conduit having an inlet and means to support said conduit adjacent said air jet means to channel broken up material towards the closely to the roll and having baffle means opposite the air jet means to channel broken up material towards the vacuum means.

References Cited
UNITED STATES PATENTS

| | | | |
|---|---|---|---|
| 2,300,908 | 11/1942 | Broughton | 15—256.53 |
| 2,586,014 | 2/1952 | Dunphy | 15—306.1 X |
| 2,977,927 | 4/1961 | Mehler et al. | 118—203 |
| 3,264,673 | 8/1966 | Scott | 15—308 |

FOREIGN PATENTS 672,430  10/1963  Canada.

ROBERT W. MICHELL, *Primary Examiner.*